(12) United States Patent
Gwak

(10) Patent No.: US 7,203,869 B2
(45) Date of Patent: Apr. 10, 2007

(54) TEST STREAM GENERATING METHOD AND APPARATUS FOR SUPPORTING VARIOUS STANDARDS AND TESTING LEVELS

(75) Inventor: Tae-hee Gwak, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 258 days.

(21) Appl. No.: 10/844,528

(22) Filed: May 13, 2004

(65) Prior Publication Data

US 2004/0230881 A1 Nov. 18, 2004

(30) Foreign Application Priority Data

May 13, 2003 (KR) .................. 10-2003-0030192

(51) Int. Cl.
*G06F 11/00* (2006.01)
*G06F 17/00* (2006.01)

(52) U.S. Cl. .................. 714/46; 707/102; 715/746; 715/700

(58) Field of Classification Search .................. None
See application file for complete search history.

(56) References Cited

U.S. PATENT DOCUMENTS 6,978,262 B2 * 12/2005 Tsai .................. 707/3
7,054,881 B2 * 5/2006 Arcand et al. .................. 707/102
7,080,303 B2 * 7/2006 Bowers .................. 714/741
7,107,574 B1 * 9/2006 Nedbal .................. 717/120
7,134,072 B1 * 11/2006 Lovett et al. .................. 715/513
2002/0046273 A1 * 4/2002 Lahr et al. .................. 709/224

FOREIGN PATENT DOCUMENTS

| KR | 2002-0032215 A | 5/2002 |
|---|---|---|
| KR | 2002-0066260 A | 8/2002 |

\* cited by examiner

*Primary Examiner*—Phung My Chung
(74) *Attorney, Agent, or Firm*—Sughrue Mion, PLLC

(57) ABSTRACT

A method and apparatus for generating a test stream wherein tests of digital TV software at various levels and various digital broadcast standards can be supported. The apparatus includes a data generator module for generating test data by referring to a database based on demands of a user, a data writer module for fetching the test data generated by the data generator module and writing the fetched test data into a text or XML data, a data transformation module for transforming the written text or XML data into a transport stream, and a database in which information needed for the modules to perform their own functions is stored and from which the stored information is fetched. The method of invention may similarly follow the functions of the apparatus.

20 Claims, 5 Drawing Sheets

TEST STREAM GENERATING METHOD AND APPARATUS FOR SUPPORTING VARIOUS STANDARDS AND TESTING LEVELS

BACKGROUND OF THE INVENTION

This application claims the priority of Korean Patent Application No. 10-2003-0030192 filed on May 13, 2003, in the Korean Intellectual Property Office, the disclosure of which is incorporated herein by reference.

1. Field of Invention

The present invention relates to a method and apparatus for automatically generating test data, and more particularly, to a method and apparatus for generating a test stream wherein tests of digital TV software at various levels and various digital broadcast standards can be supported.

2. Description of the Related Art

Korean Patent Laid-Open Publication No. 10-2002-0032215 (Korean Patent Application No. 10-2000-0063253) discloses an apparatus and method capable of automatically generating test data without performing any manual operations in order to test a DASE (Digital TV Application Software Environment) system. However, while this related art apparatus and method can be applied to a test of the DASE system, it cannot generate a transport stream, and it can generate only data confined to DASE standards as a terrestrial broadcast receiver system. Further, the final product does not have a format directly applicable to an actual receiver system since it is in a script file format. Furthermore, this script file format is not a standard format. Thus, there is a problem in that it is difficult to transform the script file into data useable in other formats.

SUMMARY OF THE INVENTION

The present invention is conceived to solve the aforementioned problems associated with the related art. An object of the present invention is to provide a method and apparatus for generating a test stream wherein tests of digital TV software at various levels and various digital broadcast standards can be supported.

Another object of the present invention is to provide a method and apparatus for allowing a user to easily confirm the contents of a test stream by generating XML (Extensible Markup Language) data as an intermediate product prior to generation of the test stream.

A further object of the present invention is to provide a method and apparatus for transforming XML data into a transport stream in a format that can be directly applied to an actual receiver.

According to an aspect of the present invention for achieving the above objects, there is provided an apparatus for generating a test stream, comprising a data generator module for generating test data by referring to a database based on demands of a user, a data writer module for fetching or obtaining the test data generated by the data generator module and writing the obtained test data into text or XML data, a data transformation module for transforming the written text or XML data into a transport stream, and a database in which information needed for the modules to perform their own functions is stored and from which the stored information is obtained.

According to still another aspect of the present invention for achieving the objects of the invention, there is provided a method of generating a test stream, comprising: confirming test requirements and a digital TV broadcast standard that are input by a user; selecting a product corresponding to the broadcast standard, determining a data generation process by reflecting the test requirements according to a list of the products, generating the data in an XML file format based on the determined process, and transforming the XML data into a transport stream.

BRIEF DESCRIPTION OF THE DRAWINGS

The above and other objects, features and advantages of the present invention will become apparent from the following description of exemplary embodiments given in conjunction with the accompanying drawings, in which.

DETAILED DESCRIPTION OF EXEMPLARY EMBODIMENTS

Concepts of significant terms used in the present invention are summarized, in a non-limiting manner, as follows:

| Terms | Meaning |
|---|---|
| Digital TV broadcast | Corresponds to a TV broadcast for providing a broadcast program guide as well as various additional information, data services, and interactive services using bi-directional channels, and the like. |
| TS (Transport stream) | Corresponds to an input data specification of a digital TV receiver system and a format for transmission of contents for a digital TV broadcast, and comprises system information and data service information. |
| SI (System Information) | Corresponds to television program information on a channel, or broadcast service content. |
| Data Service Information | Corresponds to a protocol type, an application program, and multimedia content information for data broadcasting. |
| Out of Band SI | Corresponds to information for searching a device necessary for accessing services provided through a cable. |
| XML (eXtensible Markup Language) | Corresponds to a standardized text format designed to transmit documents structured on the Internet. |
| DTD (Document type definition) | Corresponds to a document format accompanied by the document. |
| Depth First Search | Corresponds to a graph search algorithm which extends a current path as far as possible before backtracking to the last choice point and trying the closest alternative path. |
| CRC-32 (Cyclic Redundancy Check-32) | Corresponds to an error detection method for verifying the reliability of a transport stream data. |

-continued

| Terms | Meaning |
|---|---|
| MGT (Master Guide Table) | Corresponds to a table including information such as versions or lengths of other tables representing system information. |

Figure 1:
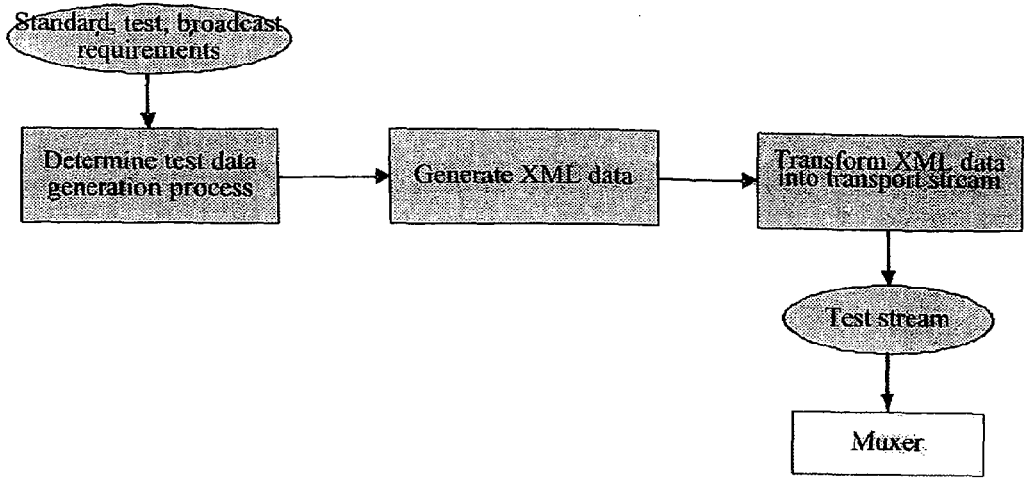
FIG. 1 is a flowchart schematically illustrating a process of generating a test stream according to the present invention.

Hereinafter, an exemplary embodiment of the present invention will be described in detail with reference to the accompanying drawings FIG. 1 is a flowchart schematically illustrating the process of generating a test stream according to the present invention. In general, the method for generating a test stream according to the present invention is implemented in the following manner. First, demands relating to digital TV broadcast standards, tests, and broadcasts are received. From this, an appropriate process is selected based on the demands, and predetermined data are generated by applying the process. Next, an intermediate product of an XML file type is generated so that a user can confirm the relevant value thereof, and the product is transformed into a transport stream of a hexadecimal type to provide the transport stream as a final product. Meanwhile, since there are various types of digital TV broadcast standards, such as a terrestrial broadcast standard, a cable broadcast standard, and an out-of-band channel standard, a transport stream should be generated through procedures and in formats appropriate to the standards as supported. The respective standards are different from one another in view of constraints, transport stream format in use, and syntax, but they are identical with one another in view of the contents of information contained therein. That is, according to the standards, a transport stream of which information with the same meaning is represented in different formats is used. Thus, the present invention allows a user to select a desired test level and a broadcast standard prior to generation of a transport stream and to determine a corresponding process and product format. The product of this method as described can be called a 'test stream'. The test stream may correspond to a transport stream formatted as an MPEG-2 TS file and also contain meta information on the broadcast stream, other than actual broadcast content. Therefore, to apply this product to the actual digital television (D-TV) software, a task for multiplexing it with an audio/video stream is required. Accordingly, a multiplexer (muxer) may be used to transmit the generated test stream.

Figure 2:
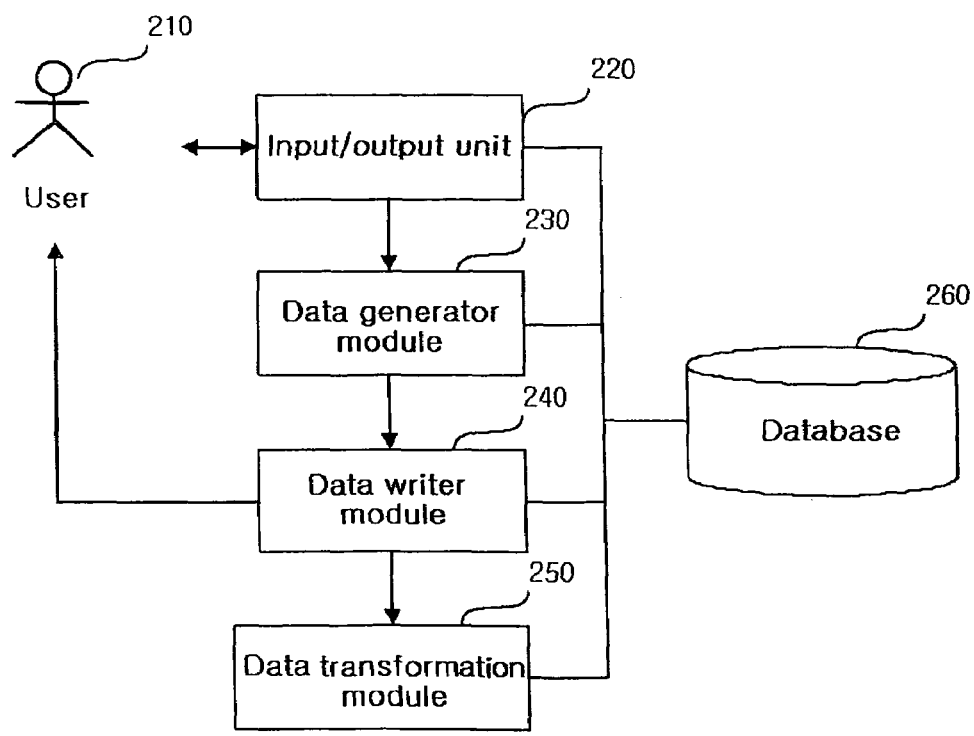
FIG. 2 is a block diagram schematically illustrating the configuration of an apparatus according to the present invention.

FIG. 2 is a block diagram schematically illustrating the configuration of an apparatus for generating a test stream according to the present invention.

The apparatus of the present invention generally comprises an input/output unit 220 for receiving demands on standards, tests, and broadcast, and displaying the results thereof to a user 210; a data generator module 230 for generating appropriate data in which the demands have been reflected; a data writer module 240 for generating XML data; and a data transformation module 250 for transforming the XML data into a transport stream. The respective modules obtain necessary information from a database 260 to perform their own functions.

The database stores information which can be fetched or obtained by the respective modules of the apparatus to enable the modules to perform their functions.

The input/output unit 220 is a module for receiving demands on digital TV broadcast standards, broadcast information, and test information. A user interface is further provided for allowing a user to select one standard from a list of several standards and to input the demands on the broadcast contents and test information.

The data generator module 230 is a module for determining a product and process corresponding to the demands. To support the selected standard, the data generator module establishes a predetermined procedure to refer to a database to determine a list of the products and a format thereof, and then generates relevant data. The types of tables for constructing the transport stream and correlation between the tables are changed according to the standard being supported. Further, the data generator module functions to generate data in a method for first searching the depth thereof (depth first searching method), when the types and generation order of the tables are determined.

The data writer module 240 is a module responsible for writing data. Data are written in an XML file format by using an external DTD (Document Type Definition).

The data transformation module 250 functions to transform XML data into a transport stream and includes a parser and a stream writer. The parser is responsible for transforming the XML data into a binary stream through a validation process and calculating a length of the stream to additionally write the calculated length in a proper position of the stream. The stream writer transforms the binary stream into a hexadecimal stream and calculates a cyclic redundancy check (CRC)-32 value to complete the transport stream.

Figure 3:
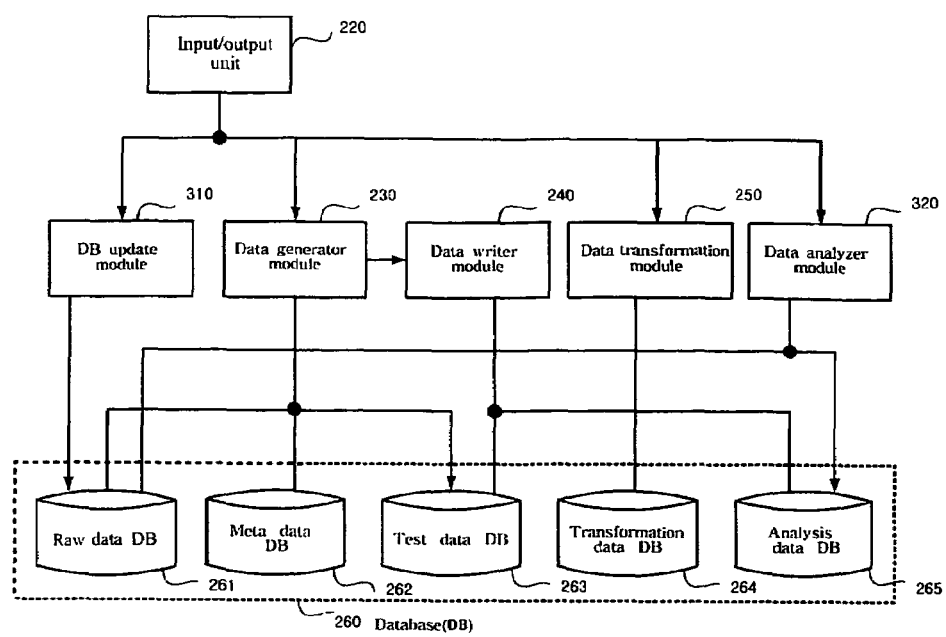
FIG. 3 is another block diagram specifically illustrating the configuration of the apparatus according to the present invention.

FIG. 3 is a block diagram specifically illustrating the configuration of the apparatus of the present invention.

The database 260 includes a raw data DB (Database) 261, a meta data DB 262, a test data DB 263, a transformation data DB 264 and an analysis data DB 265.

The raw data DB 261 is a database for storing data forming broadcast contents. This database is referred to for generating a broadcast scenario and is mainly classified into channel information and broadcast program content information.

The meta data DB 262 is a database for storing MPEG-2 TS standard information, and the numbers of functions to automatically generate test data necessary for generating the test data. This database may be divided into a content information database (i.e., first meta data DB) referred to for generating field values of the test data and a structure information database (i.e., second meta data DB) referred to for generating the structure of the test data.

The first meta data DB includes, among other information, tables, which form an MPEG-2 TS, field names, field types, bit numbers, ranges of field values, function numbers for determining test data values, and the like. The second meta data DB includes tables, which form an MPEG-2 TS, field names, and function numbers for generating hierarchical relations between structures of the tables which are needed for determining the structure of the test data, and the like.

The test data DB 263 is a database for temporally storing the generated test data before the test data is processed into a file. To reduce system loads, data is intended to be stored in the database one at a time. Because test data DB 263 is used to temporally store the generated test data, the test data DB 263 may include tables with the same names as tables of the meta data DB where the test data standards have been stored.

The transformation data DB 264 is a database referred to for encoding the XML data into a TS file. That is, it is a database from which each bit number of relevant fields is obtained upon parsing an XML file. Tables of the transformation data DB 264 can be the same as those of the meta data DB 262, except that some fields, such as table length, which are generated at the time of encoding, are added to the tables of the transformation data DB 264.

The analysis data DB 265 is a database for storing coverage analysis results of the generated test data, and can be used to store the results accumulated over a certain period. The analysis data DB 265 is comprised of tables for analyzing the test data and tables for storing the analysis results. The database further includes a table for storing analysis results for accumulation coverage analysis, a table for recording a used event scenario, a table for storing information on the generated test data, etc.

The input/output unit 220 is a device for receiving predetermined demands from a user to generate test data containing both a content and structure that the user wants, and is also a module for providing the generated test data itself, analysis information on the test data, and the like. This is intended to increase efficiency of the development process by assembling all interfaces and relevant classes of the present invention into one package. To this end, an interface is provided for allowing a user to access and update the raw data DB 261 that is referred to for establishing a broadcast schedule corresponding to the content of the test data. According to the present invention, this module can control the operations of all the modules of the present invention, such as an encoding apparatus and an apparatus for generating test data by selecting a desired standard, except for the test data file writer module. The input/output unit 220 includes a main frame for controlling all interfaces of the present invention; a standard-selection device for selecting a standard to be reflected onto the generation of test data, i.e., whether the standard is either ATSC (Advanced Television Systems Committee) or OCAP (OpenCable Application Platform), and more specifically, whether it is for use in a terrestrial or cable broadcast when ATSC is selected; a testing-level input device for performing the function of receiving a desired testing level to generate the test data corresponding to an applicable standard; a module input device for receiving test modules from the user in case of module testing and integration testing; a scenario input device for performing the function of receiving a scenario including the demands necessary for generating the test data; a file editor for opening, correcting, storing and/or outputting a test data file or scenario file; and respective handlers for calling the data generator module 230, the data transformation module 250, a data analyzer module 320, and a DB update module 310.

The data generator module 230 is a device for generating the test data by referring to the database based on the user's demands input through the input/output unit 220. The test data are generated in the order of structure and content; and PSI (Program Specific Information), PSIP/SI (Program System Information Protocol/Service Information), and SDF (Service Description Framework) are sequentially generated according to the rules and constraints of MPEG-2 TS corresponding to the standard of the test data. Moreover, the data generator module is divided into a sub-module for generating the structure of the test data and a sub-module for generating the content of the test data. The data generator module 230 may comprise a generator manager for controlling and managing all processes related to the test data generation; a broadcast scheduler, which should be activated prior to test data generation, for making plans related to the broadcast content and broadcast time by referring to the raw data DB 261: a structure generator for generating table structures of PSI, PSIP/SI (with extended text tables (ETT) and master guide tables (MGT) excluded therefrom), DST and the like under the control of the generator manager: a content generator for generating field values of PSI, PSIP/SI (with ETT and MGT excluded therefrom), DST and the like under the control of the generator manager; an ETT generator for generating a structure and content of an ETT table of the PSIP: and an MGT generator for generating a structure and content of an MGT table of the PSIP.

The operation of the data generator module 230 will now be discussed. When called by the input/output unit 220, the data generator module 230 generates the test data, records the generated data into the test data DB 263, and then calls the data writer module 240. The data generator module 230 performs its own role by sequentially activating the internal modules under the control of the generator manager. When the operation of the broadcast scheduler called by the input/output unit 220 is finished, it is ready to prepare a scenario for test data generation. The generator manager is activated at this time. The test data are generated in such a manner that the structure is first generated in the order of PSI, PSIP/SI and SDF and relevant values are then filled into the structure. In the structure generation step, the structure generator is called and then operates in such a manner that the structure of the test data is determined by referring to the meta data DB 262 according to a test data generating scenario and then recorded in the test data DB 263. In the content generation step, the content generator is called and then operates in such a manner that the field values are determined by similarly referring to the meta data DB 262 and then recorded along the structure of the test data recorded in the test data DB 263. After the generation of test data has been completed, the data writer module 240 is called through the generator manager to write the test data into a file.

The data writer module 240 obtains the test data, which has been recorded in the test data DB 263 by the data generator module 230, and then causes the obtained test data to be written into a TXT or XML file or the scenario used for generating the test data to be recorded into the file. The test data in the MPEG-2 TS format corresponding to a product of the present invention are processed into a TXT or XML file format and then provided to the user. Thus, to apply these data to D-TV software, the product of the present invention should be transformed into an actual transport stream. To this end, the test data can be processed into the XML file which in turn can be provided to the user, and a DTD for the test data in the XML file format should be declared as an external DTD so that structure changes thereof can be easily reflected. The data writer module 240 includes a scenario writer for writing a scenario, which is used when generating the test data, into a file, and a test data writer for writing the test data, which have been recorded in the test data DB 263, into a file under the control of the generator manager of the data generator module 230. The operation of the data writer module 240 is as follows.

The data writer module 240 writes the test data into three files, i.e., PSI, PSIP/SI and SDF and then writes the scenario used to generate the test data into a file, under the control of the generator manager of the data generator module 230. Further, the data writer module accumulates and records the scenario file, and causes the ID of the test data generated for managing a list of test data files to be stored in the analysis data DB 265.

The data transformation module 250 is the module responsible for transforming the generated test data into a transport stream (TS file) corresponding to an input format for a relevant system so as to apply the test data to the relevant system. The data transformation module receives the name of the test data file written into an XML file and then transforms the file into a TS file. If the names of TS files for two test data files are identical, the TS file that has been generated by encoding the first test data file should not be overwritten when encoding the second test data file.

In order to operate the data transformation module 250, the test data in an XML file format should be generated beforehand. Thus, when the apparatus of the present invention is initially activated, i.e. before the test data in the XML file format is generated, the data transformation module 250 is not called. The data transformation module 250 may be comprised of a parser, a CRC-32 generator and a transport stream (TS) writer.

The parser serves to parse a test data file to write the parsed file into a binary string. When parsing the fields of the XML file and expressing the file as a binary string, the parser refers to the transformation data DB 264 to recognize the bit numbers of the fields. If the XML file to be encoded is selected, the file is written into a binary string by fetching terminal node units (i.e., elements) one by one after verification procedure with the DTD. Further, the parser is called by the input/output unit 220, and it calls the transport stream writer after the XML file has been transformed into a binary string.

The transport stream (TS) writer serves to transform the binary string generated by the parser into a hexadecimal string and take over the CRC-32 field value from the CRC-32 generator to write them into a TS file. When the length of the TS file exceeds the maximum length of 188 bytes, the TS file is divided into several files.

The CRC-32 generator is a module for generating a CRC-32 field value. When a hexadecimal string to be written into a TS file is produced, the generator calculates the CRC-32 field value for error checking and sends the value to the transport stream (TS) writer.

The data analyzer module 320 provides not only the function of simply generating test data owing to a testing tool of the present invention, but also the function of indirectly assisting a user in performing actual testing by providing the user with coverage analysis results for the test data generated by the testing tool. Further, since the broadcast content is determined based on the content of the raw data DB 261 during the work for generating the test data according to the present invention, quality of the raw data DB 261 content is directly correlated with that of the generated test data. Accordingly, the tool analyzes the status of the raw data DB 261 and shows the analyzed results to the user. The data analyzer module 320 analyzes the coverage based on an MPEG-2 TS and an Application Program Interface (API) or message of the D-TV software under the control of the main frame of the input/output unit 220, and shows the analyzed results using various kinds of tables and graphs. To accumulate and manage the coverage analysis results, the analyzed information is recorded in the analysis data DB 265.

The DB update module 310 is a module which is designed for allowing a user to directly access the database such that the user can add, correct, or delete the content of the raw data DB 261. The DB update module 310 is activated when called by the input/output unit 220, and also calls the input/output unit 220 to show the update results to the user after performing its own function mentioned above.

Figure 4:
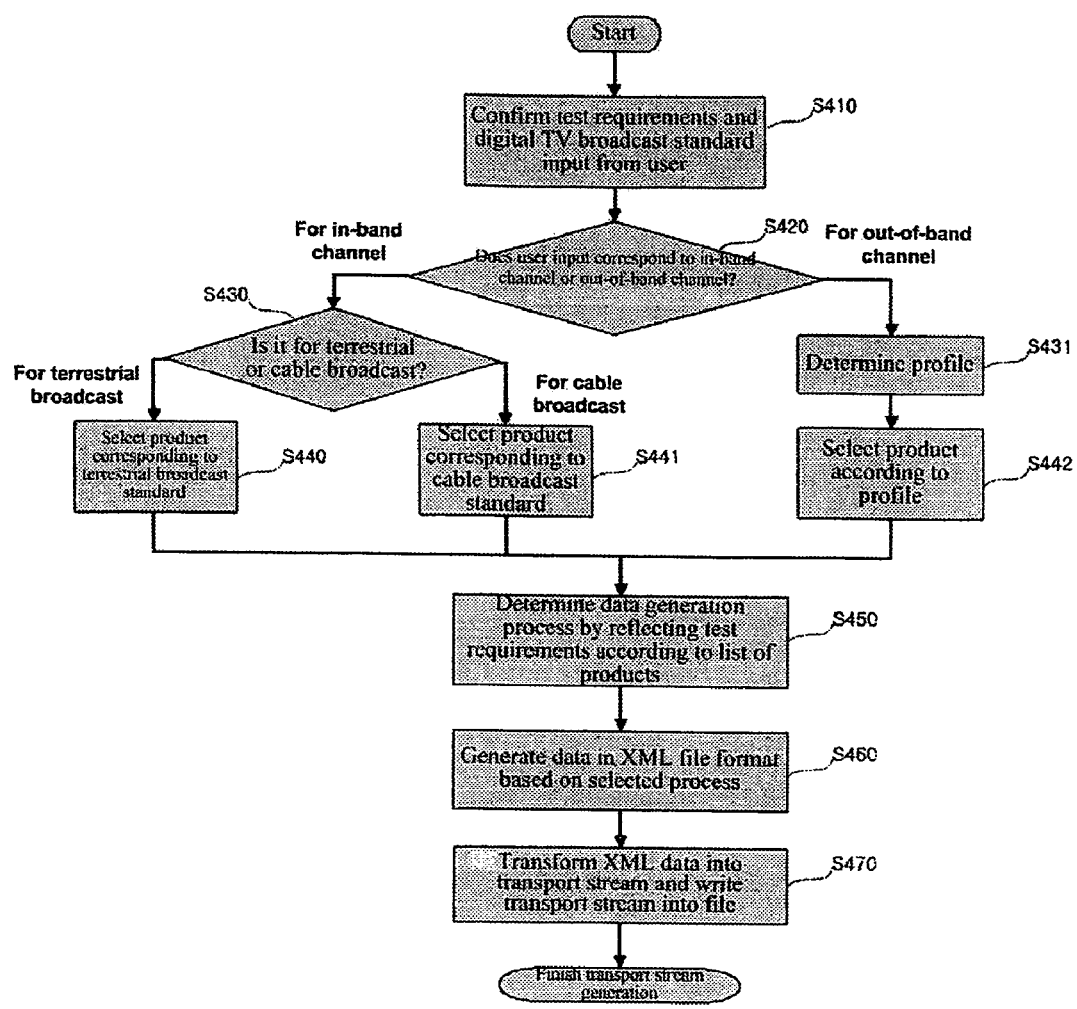
FIG. 4 is a flowchart illustrating a method according to the present invention.

FIG. 4 is a flowchart illustrating a method according to the present invention.

Referring to FIG. 4, a user selects a digital broadcast standard and inputs the broadcast and test requirements (S410). The requirements may be constructed, as follows.

| Classification | | Details |
|---|---|---|
| Standard | In-band channel | For terrestrial broadcast and cable broadcast. |
| | Out-of-band channel | Profiles 1 and 2, profile 3, profile 4, profile 5, profile 6. |
| Test | | System test, module test, integration test. |
| Broadcast | | Channel information, broadcast service information. |

It is determined whether the user requests an in-band channel or out-of-band channel (S420). If an in-band channel is selected, either a terrestrial broadcast standard or cable broadcast standard is selected (S430). If an out-of-band channel is selected, a predetermined profile level is selected (S431).

A product corresponding to the standard for a terrestrial broadcast, cable broadcast, or an out-of-band channel having a determined profile is selected (S440, S441, S442). These steps are executed by referring to the database 260 (see FIG. 2), and the product is classified into broadcast program information and data service information. That is, a list of tables for the broadcast program information and a list of tables for the data service information are selected. However, while the necessary tables are selected, the execution order of the selected tables is not determined.

When the product is selected, a process including a method or procedure for generating the product in accordance with the product list is determined (S450). Because the tables have a correlation with each other, the generation order between the tables is present. That is, there is a case where table B is not generated until table A is generated. For example, since a MGT table has meta information on the other tables, generation of the MGT table begins after all the other tables have been generated when generating the broadcast program information.

Thereafter, when the format and generation procedure of the product are determined, the data are written into an XML file format (S460). Finally, the XML data are transformed into an actual transport stream format and written into a file (S470).

Figure 5:
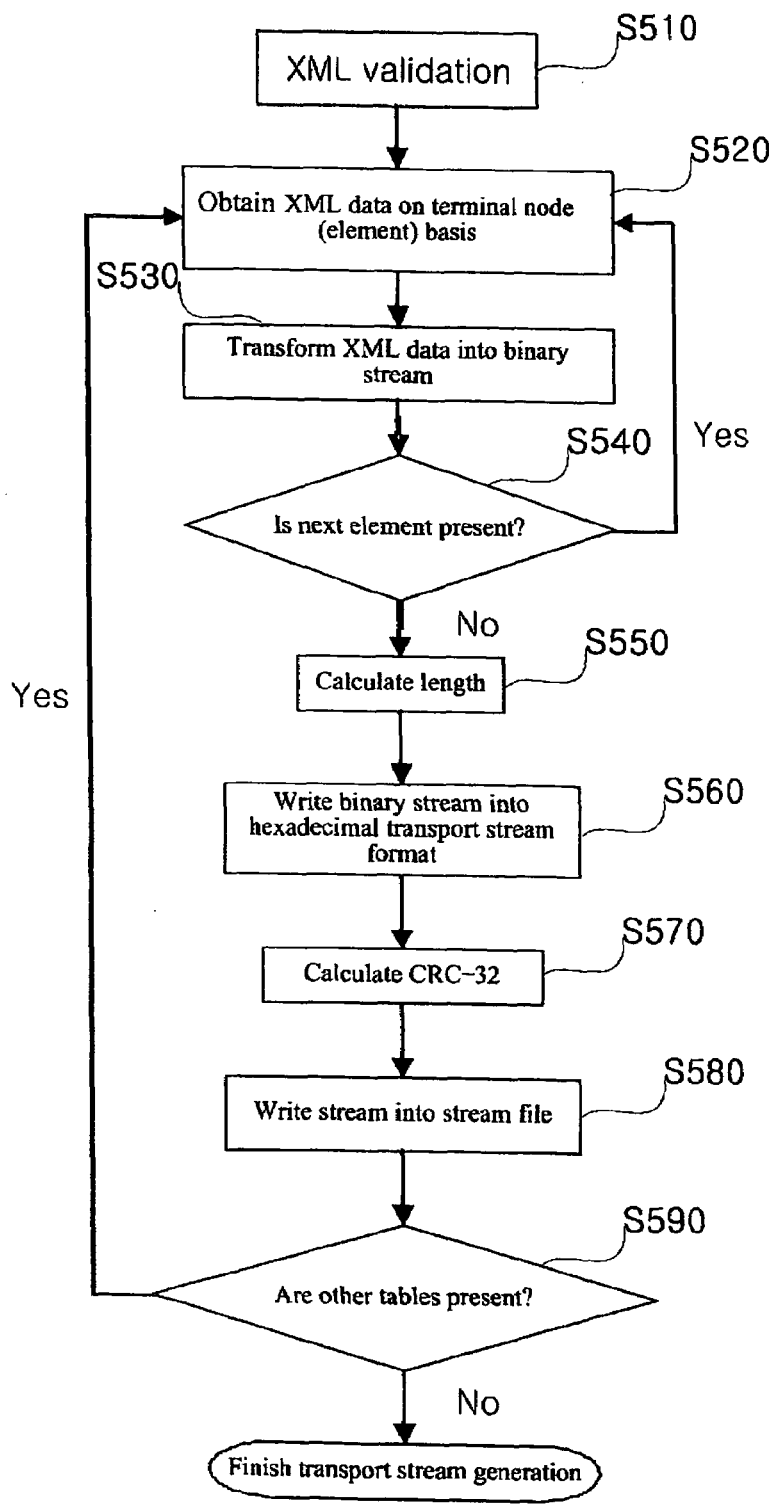
FIG. 5 is a flowchart illustrating a process of transforming XML data into actual transport streams.

FIG. 5 is a flowchart showing a process (S470 in FIG. 4) of transforming XML data into an actual transport stream and writing the transport stream into a file.

To transform XML data into a transport stream, validation of the XML data is first performed for validity confirmation through comparison with previously declared external DTD (S510). Second, if validity conformation has been competed, respective terminal nodes, i.e., elements, are obtained while searching for XML data on a table basis in a depth first searching method (S520). Third, the value of each terminal node is transformed into a binary stream until the next element is no longer present (S530 and S540). Fourth, if the transformation into a binary stream for one table is completed, the length of the stream is calculated and inserted into a proper position of the stream (S550). Fifth, the binary stream is segmented on an 8 bit basis and transformed into a hexadecimal stream (S560). Finally, a CRC-32 value is calculated and added to the stream as the last 4 bytes (S570), and the stream with the CRC-32 value added thereto is written into a stream file (S580). Then, the work for writing the transport stream into a file continues to be performed until the remaining tables are no longer present (S590).

Figure 6:
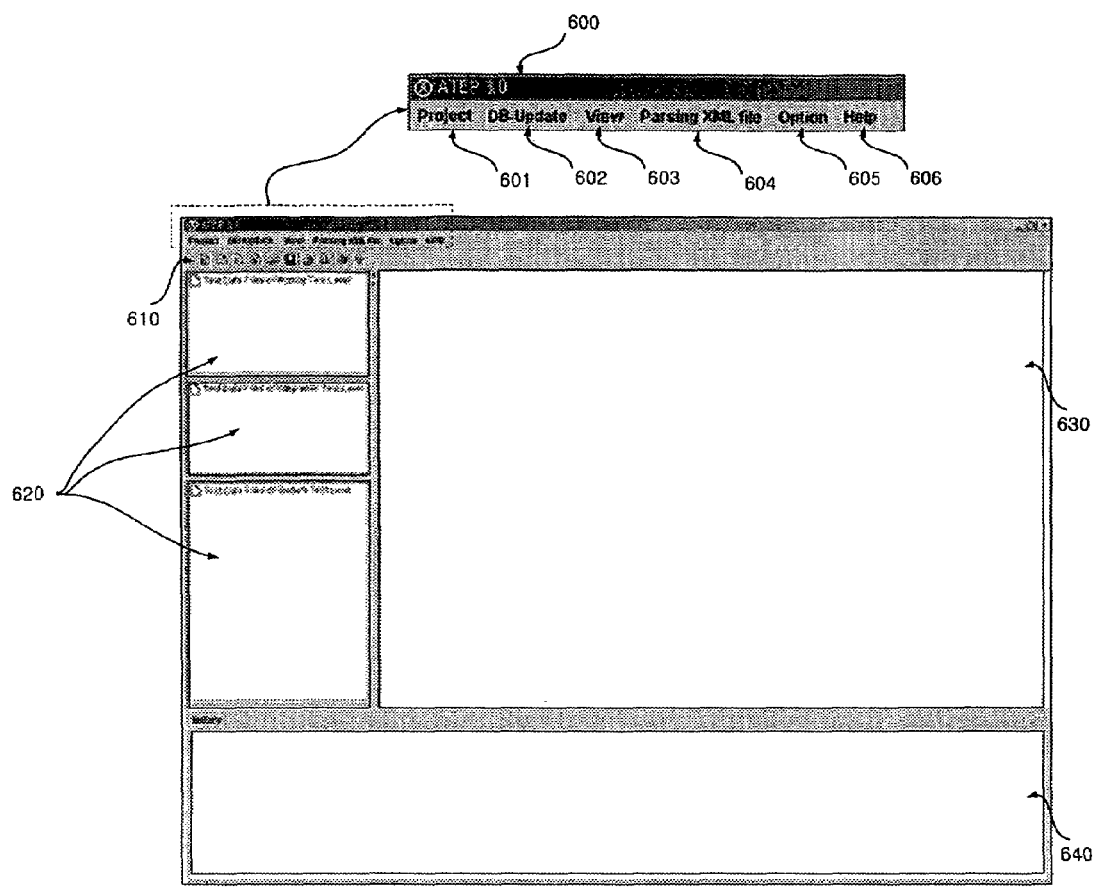
FIG. 6 shows an initial screen of a software program for executing a method according to the present invention.

FIG. 6 is an initial screen of a software program for executing a method according to the present invention.

Referring to FIG. 6, as a non-limiting example, the initial screen may be mainly comprised of a menu bar 600, a tool bar 610, a test data list tree 620, a text area 630, and a history tab 640.

The menu bar 600 may also include a 'Project' menu 601 for providing the function of generating test data according to a testing level, a 'DB-Update' menu 602 for providing the function of updating a database, a 'View' menu 603 for providing the function of confirming analysis results of the generated test data, a 'Parsing XML file' menu 604 for providing the function of parsing an XML file and transforming the parsed file into a TS file, an 'Option' menu 605 for providing the function of selecting a standard to be applied to the generation of test data, and a 'Help' menu 606 for providing a user with help and version information contained therein.

More specifically, the 'Project' menu 601 may include the following submenus: a 'New Module Test Level' menu for generating test data for module testing; a 'New Integration Test Level' menu for generating test data for integration testing; a 'New System Test Level' menu for generating test data for system testing; a 'New-Random' menu for generating test data by receiving only simple input from the user and randomly determining other scenarios necessary for the generation of test data in the tool; a 'New Non-Random' menu for generating test data by establishing a scenario for generating test data using an input value specified by the user; an 'Open' menu for providing the function of obtaining stored test data or a scenario file; and a 'Save' menu for providing the function of correcting and storing the test data.

Further, the 'DB-Update' menu 602 may include the following submenus: a 'Major Channel' menu for updating major-channel tables in the raw data DB 261 (FIG. 3); a 'Long Channel Name' menu for updating long-channel name tables in the raw data DB 261; an 'Event' menu for updating event tables in the raw data DB 261; an 'Audio' menu for updating audio tables in the raw data DB 261, a 'Video' menu for updating video tables in the raw data DB 261; a 'Data Service' menu for updating application tables (i.e., tables for storing contents of data services) in the raw data DB 261; a 'Data Service with Event' menu for updating event data tables (i.e., tables used in a case where events and data services are broadcast in time) in the raw data DB 261; a 'Data Service with Audio' menu for updating audio data tables (i.e., tables used in a case where audio and data services are broadcast in time) in the raw data DB 261; and a 'Data Service with Video' menu for updating video data tables (i.e., tables used in a case where video and data services are broadcast in time) in the raw data DB 261.

Furthermore, the 'View' menu 603 may include the following submenus: an 'MPFG-2 Coverage' menu for showing information on the test data analyzed in connection with an MPEG-2 TS standard; a 'Native API & MSG Coverage' menu for showing the coverage based on module-related APIs or messages MSGs when the test data for module testing and integration testing are generated: and a 'DB Status' menu for showing the contents and numbers of the data according to the respective tables in the raw data DB 261 in the form of a bar graph.

In addition, the tool bar 610 is constructed in the form of a collection of icons for performing the functions frequently used in the menus. The test data list tree 620 shows the test data, which are generated according to the respective test levels, at the upper left portion of the screen in a tree form. When a name of the test data file generated in the test data list tree is selected, the contents of the test data are displayed in the text area 630. The history tab 640 shows scenario information on the test data, such as the ID of the test data, generation date, user demands for the test data generation, and coverage of the generated test data, which are currently being generated, during the generation of test data.

According to the present invention, a test stream that is proper for module tests and integration tests as well as system tests for digital TV software can be generated.

Further, since a variety of digital TV broadcast standards can be supported, a transport stream can be generated by selecting and using product formats and processes proper for the standards.

Furthermore, since an intermediate product in an XML file format can be provided, the confirmation by a user can be easily made and transformation into a format other than a transport stream can be flexibly performed.

In addition, since the transformation into a transport stream corresponding to an input format of a digital TV receiver system is supported, the present invention can be directly employed in the test of an actual receiver Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for generating a test stream, the apparatus comprising:
    a first device; and
    a second device;
    wherein a user can input demands into the first device related to a digital television broadcast standard and one or more test requirements,
    wherein the second device provides an intermediate product in a file format based on the user's demands,
    wherein because of the file format, the user can confirm a value of the intermediate product using the first device, and
    wherein the second device transforms the intermediate product to generate the test stream.

2. An apparatus for generating a test stream, the apparatus comprising:
    a data generator module for generating test data by referring to one or more databases based on demands of a user;
    a data writer module operable to obtain the test data generated by the data generator module and to write the obtained test data into text or eXtensible Markup Language (XML) data:
    a data transformation module for transforming the text or XML data into a transport stream; and
    the one or more databases in which information needed for the data generator module, the data writer module, and the data transformation module to perform their own functions is stored and from which the stored information is obtained.

3. The apparatus as claimed in claim 2, further comprising an input/output unit for receiving the demands of the user and showing a result thereof to the user.

4. The apparatus as claimed in claim 3, wherein the input/output unit comprises a standard-selection device for selecting a digital television broadcast standard to be reflected onto the generating of the test data.

5. The apparatus as claimed in claim 2, further comprising:
- a database (DB) update module for allowing the user to directly access the one or more databases and to change content of the one or more databases; and
- a data analyzer module for providing the user with coverage analysis results of the test data.

6. The apparatus as claimed in claim 2, wherein the one or more databases comprise:
- a raw data database (DB) for storing data forming broadcast content;
- a meta data DB for storing standard information on the transport stream necessary for generating the test data;
- a test data DB for temporarily storing the generated test data before processing the generated test data into a file;
- a transformation data DB referred to for encoding the generated test data into a transport stream file; and
- an analysis data DB for storing coverage analysis results of the generated test data.

7. A method of generating a test stream, the method comprising:
- inputting user demands related to a digital television broadcast standard and one or more test requirements;
- providing an intermediate product in a file format based on the user's demands;
- confirming a value of the intermediate product; and
- transforming the intermediate product to generate the test stream.

8. A method of generating a test stream, the method comprising:
- confirming test requirements and a digital television broadcast standard that are input by a user;
- selecting a product corresponding to the broadcast standard;
- determining a data generation process by reflecting the test requirements according to a product list;
- generating test data based on the data generation process; and
- transforming the test data to generate the test stream.

9. The method as claimed in claim 8, further comprising: receiving the user input and determining whether the user input corresponds to an in-band channel standard or an out-of-band channel standard.

10. The method as claimed in claim 9, further comprising determining whether the in-band channel standard is for a terrestrial broadcast or cable broadcast when the user input corresponds to the in-band channel standard.

11. The method as claimed in claim 9, further comprising determining a profile when the user input corresponds to the out-of-band channel standard.

12. The method as claimed in claim 8, further comprising generating the test data in an eXtensible Markup Language (XML) file format based on the determined data generation process.

13. The method as claimed in claim 12, further comprising transforming the XML data into a transport stream.

14. The method as claimed in claim 13, wherein the transforming the XML data into a transport stream further comprises:
- confirming validity of the XML data;
- obtaining the XML data on a terminal node basis;
- transforming the obtained XML data into a binary stream; and
- writing the binary stream into a hexadecimal transport stream file.

15. The method as claimed in claim 14, wherein the transforming the XML data into a transport stream further comprises, if the transforming the obtained XML data into a binary stream is completed for a table of the XML data, calculating a length of the binary stream and inserting the length into a proper position of the binary stream.

16. The method as claimed in claim 15, wherein the transforming the XML data into a transport stream further comprises calculating a cyclic redundancy check-32 (CRC-32) value and adding the value to a hexadecimal stream written into the hexadecimal transport stream file.

17. A method of generating a test stream from eXtensible Markup Language (XML) data generated according to user demands, the method comprising:
- confirming validity of the XML data;
- obtaining the XML data on a terminal node basis;
- transforming the obtained XML data into a binary stream; and
- transforming the binary stream into a hexadecimal stream to generate the test stream.

18. The method as claimed in claim 17, further comprising, if the transforming the obtained XML data into a binary stream is completed for a table of the XML data calculating a length of the binary stream and inserting the length into a proper position of the binary stream.

19. The method as claimed in claim 18, further comprising calculating a cyclic redundancy check-32 (CRC-32) value and adding the value to the hexadecimal stream as part of generating the test stream.

20. A computer readable recording medium comprising a computer program comprising instructions that when executed, are operable to generate a test stream, the instructions operable for:
- confirming test requirements and a digital television broadcast standard that are input by a user;
- selecting a product corresponding to the broadcast standard;
- determining a data generation process by reflecting the test requirements according to a product list;
- generating test data based on the data generation process; and
- transforming the test data to generate the test stream.

* * * * *